MAURICE F. HASLER,
INVENTOR.

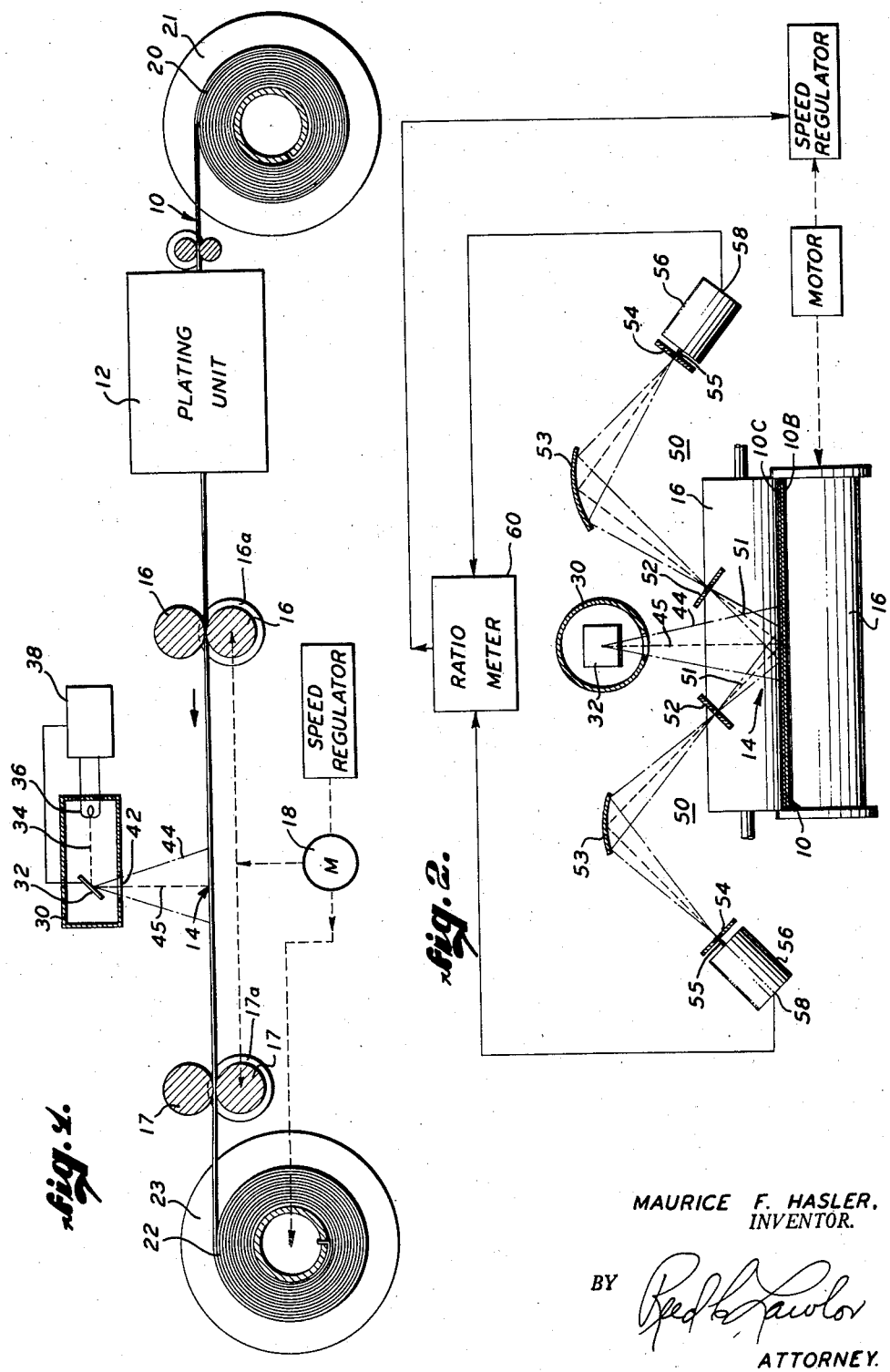

July 28, 1959 M. F. HASLER 2,897,371
SPECTROSCOPY
Filed Aug. 1, 1956 3 Sheets-Sheet 3

MAURICE F. HASLER,
INVENTOR.

BY
ATTORNEY

United States Patent Office 2,897,371
Patented July 28, 1959

2,897,371

SPECTROSCOPY

Maurice F. Hasler, Glendale, Calif., assignor, by mesne assignments, to Applied Research Laboratories, Inc., Glendale, Calif., a corporation of Delaware Application August 1, 1956, Serial No. 601,565

17 Claims. (Cl. 250—83.3)

This invention relates to improvements in systems for measuring the thickness of a coating of one material on another material and more particularly to improvements in methods and apparatus for measuring the thickness of such a coating by means of X-rays.

For many years X-rays have been employed to determine the thickness of a coating on a base material. Some of the methods employed heretofore have involved the direction of an incident beam of X-rays toward the coated object from a position spaced from the object on the coated side thereof and the measurement of the intensity of X-rays that are returned from the object to the same side thereof from which the incident X-rays have originated. The intensity of the beam so measured is then compared with the intensities of beams returned from samples having coatings of known thickness thereon to determine the thickness of the coating on the coated article being tested.

The most important field for the application of such techniques lies in the field of measurement of the thickness of a protective metal coating on a strip of metal as the coating is being deposited. When applied, for instance, to the gauging of the thickness of a tin coating being deposited on a strip of sheet iron, the strip of iron leaving the plating bath is continuously drawn past a testing station adjacent which an X-ray source and an X-ray detector are located. The results of the measurements obtained are employed in the control of the plating process.

In these prior art systems considerable difficulty has been experienced because of the fact that accurate locating of the coated strip in the testing zone has been required. In other words, accurate control of the distance of the coated sheet from the X-ray source and detector has been essential. Unless such accuracy of position is preserved, errors in position are likely to produce spurious indications of change in thickness because of the effect that a change in position has on the intensity of the detected beam of X-rays.

Because of the fact that the apparatus itself, including the X-ray source and the detector as well as other parts, is rather bulky and because of the requirements for accurate control of the movement of the coated strip through the testing zone, difficulties have been experienced heretofore in the incorporation of such methods of gauging into production lines which have already been constructed without making special provision for the use of X-ray gauging equipment.

According to this invention, the need for accurate control of the path of movement of the coated strip through a testing zone is eliminated. This is made possible by measuring the ratio of intensities of two beams of X-rays that are returned from the coated strip and utilizing variations in this ratio measurement to indicate the changes in the thickness of the coating. The two beams of X-rays so measured have different wavelengths, and these wavelengths are so selected in relationship to the properties of the coating material or the base material, or both, that the ratio of the intensities of the beams varies with the thickness of the coating. The manner in which the wavelengths are selected and examples of the application of this invention are described in detail hereinafter.

Briefly, though, it may be pointed out that the ratio so obtained depends upon the thickness of the coating, and it is substantially independent of the distance of the coated strip from the source of X-rays and from the X-ray detecting system, so that there is no longer any need for accurately controlling the movement of the coated strip through the testing zone. In one method of employing the invention, a change in this ratio is employed to indicate a change in thickness of the coating. In another method of employing this invention, the thickness of a coating is determined by comparing the ratio so measured with ratios similarly obtained for strips of base material having coatings of known thickness on them.

Also in accordance with this invention, a source of X-rays and a pair of X-ray detectors set to detect X-rays of such different wavelengths are combined with means for continuously feeding a coated sample under test through a test zone so as to facilitate the measurement of changes in the sample coating thickness as it is moved through the testing zone. And also in accordance with this invention, a ratio-detecting device, that detects the ratio of intensities of such X-rays, is employed to control the coating process.

The foregoing and other aspects of this invention, together with various advantages and features thereof, will be set forth in the following description of the accompanying drawings, in which:

Fig. 1 is a schematic side view of an embodiment of this invention partly in section;

Fig. 2 is a schematic transverse view partly in section;

Figure 4A:
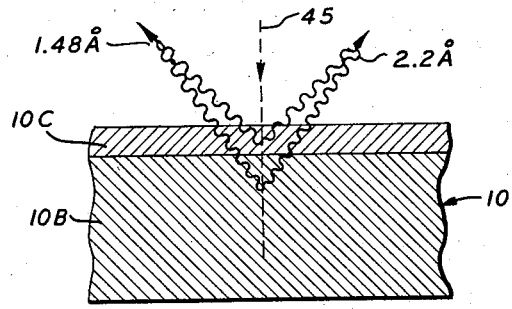
Figure 4B:
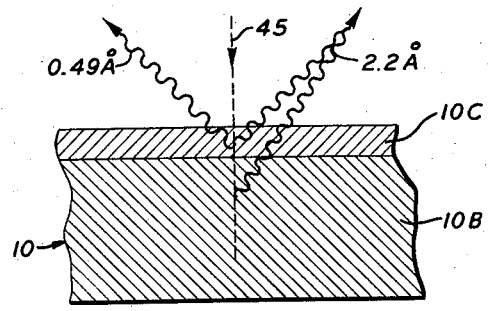
Figure 4C:
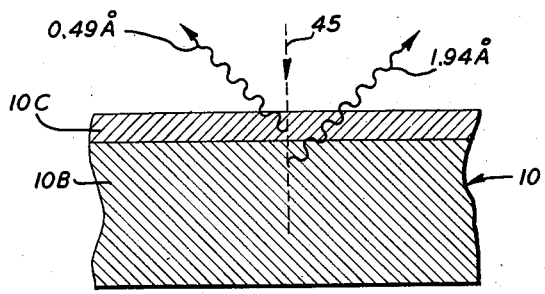
Figure 5:
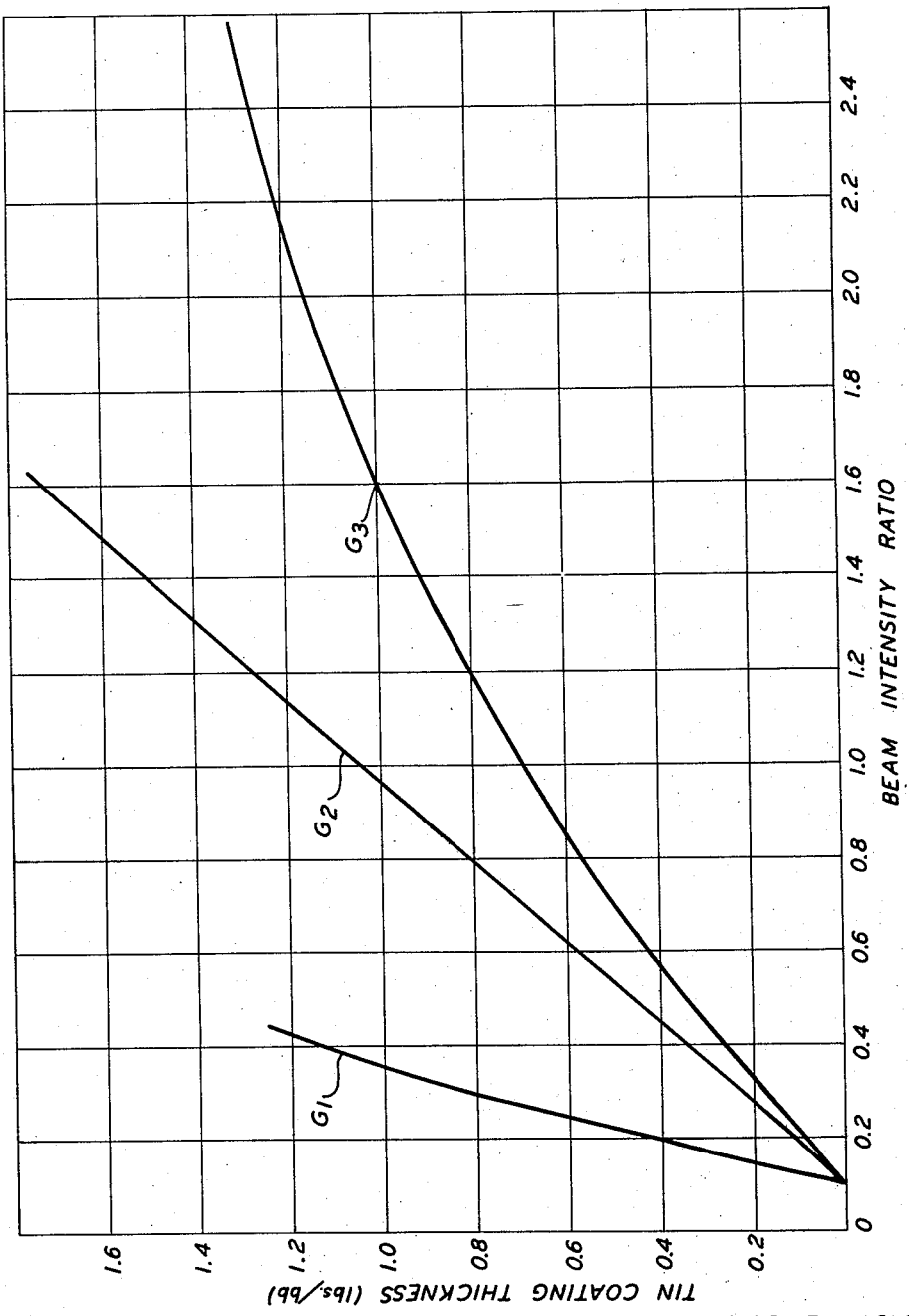

Figs. 4a, 4b, and 4c are diagrams employed in explaining various forms of the invention; and Fig. 5 is a graph of calibration curves.

As shown in schematic diagrams Figs. 1 and 2 illustrating an embodiment of the present invention, an uncoated strip 10 of steel is drawn through a tin-plating unit 12, and the coated strip is then carried through a testing zone 14. The strip of steel 10 may be drawn from a supply roll 20 or some other source of supply, and the finished tested material may be fed to a storage roll 22 or cutting equipment or other storage equipment, as desired. In the specific embodiment of the invention illustrated, the raw strip from the supply 20 is plated on the upper side thereof in the plating unit 12 and is then dried, prior to being carried by input rollers 16 and output rollers 17 through the testing zone 14. The movement of the coated strip through the testing zone is accomplished by means of the pairs of input and output rollers 16 and 17 located on opposite sides of the testing zone 14. The rolls are driven by means of a motor 18. The motor is connected to the lower rollers 16 and 17 of each pair through a constant ratio speed reducer (not shown), and the motor is also employed to control the rotation of drums 21 and 23 on which the supply and takeup rolls 20 and 22 are wound. Flanges 16a and 17a at the sides of the lower rollers 16 and 17, or other guide means, limit the sideward movement of the strip 10, though the level of the strip in the testing zone 14 fluctuates as the strip is moved longitudinally.

A source 30 of X-rays is located directly above the testing zone 14. In most embodiments of the invention, the source is heterochromatic, though under some circumstances the invention may also be practiced with a monochromatic source. In the embodiment of the invention illustrated, X-rays are generated in the source by bombarding an anode 32 with an accelerated beam 34 of electrons emerging from a thermally emissive cathode 36. A power supply 38 connected to the anode 32 and to the cathode 36 is employed to establish a positive potential at the anode compared with the potential at the cathode. An electron beam 34 of X-rays formed at the anode 32 emerges from a window 42 in the wall of the X-ray source 30, thereby forming a diverging beam of X-rays 44 that is directed downwardly to the upper side, that is the coated side, of the steel strip 10 along an incident beam axis 45.

As indicated particularly in Fig. 2, two curved-crystal X-ray monochromators 50, 50 are also arranged above the testing zone 14. Each of the monochromators 50 has parallel entrance and exit slits 52 and 54 respectively, and each employs a curved crystal 53 to cause X-rays of a selected wavelength entering the entrance slit 52 to be focused on the exit slit 54. The entrance axes 51, 51 of the two monochromators and the axis 45 of the source converge in the testing zone and substantially intersect as about the level of the upper surface of the coated strip 10. As illustrated, the axis 45 of the incident beam and the entrance axes 51, 51 of the monochromators 50, 50 lie in a common plane transverse to the path along which the strip advances, though this is not required. In the best mode of practicing the invention, the incident beam axis 45 is nearly normal to the surface of the strip 10, and the entrance axes 51, 51 of the two monochromators are about equally inclined to the surface of the strip 10 and to the incident beam axis 45. In the drawings, the entrance and exit slits 52, 52 and 54, 54 of the two monochromators are parallel to each other and to the coated strip.

The incident beam of X-rays from the source fills a circular cone having an apex angle of about 40° to 60° substantially uniformly. Each of the monochromators is adapted to receive radiation from various directions lying within a pie-shaped cone having a dihedral angle of about 7½°. The cones from which the monochromators receive radiation lie within the incident beam cone at the level of the coated strip.

X-rays returned upwardly from the coated strip 10 enter the entrance slits 52, 52 of the two monochromators 50, 50. In each of the monochromators, X-rays of different selected or predetermined wavelengths are focused on corresponding exit slits 54, 54. The manner in which a monochromator is set to select a particular wavelength is well known in the art to depend on the curvature of the crystal, the lattice structure of the crystal, and the relative positions of the crystal and the entrance and exit slits of the monochromator. As a result, two monochromatized beams 55, 55 characterized by different wavelengths emerge from the two exit slits 54, 54. These wavelengths are selected in such a way as to enable the user to determine the thickness of the coating on the strip 10. Two detectors 56, 56 are located opposite the exit slits 54, 54, these detectors being of such character as to produce electrical currents or voltages at their outputs 58, 58 which are proportional to the intensity of the X-rays impinging thereon through the exit slits 54, 54. The currents or voltages generated at the two outputs are supplied to a ratiometer 60 which measures the ratio of the outputs of the two detectors 56, 56 and hence the ratio of the intensities of the two monochromatic X-ray beams emerging from the two monochromators 50, 50. If desired, the outputs of the individual detectors 56 may be separately measured and the ratio determined arithmetically. Likewise, in some applications of the invention, a single monochromator may be employed, and it may be set at two different wavelengths, one at a time, and the intensities of the two monochromatic beams produced at the different times measured and their ratio determined arithmetically. If the strip is also coated on the bottom and the thickness of the lower coating is also to be measured, a separate source and a separate pair of detectors are arranged beneath the testing zone.

Considered broadly, in accordance with this invention, the wavelengths of the two monochromatic X-ray beams 55, 55 produced by the two monochromators 50, 50 are so chosen with respect to the properties of the material composing the coated strip that the ratio of intensities varies with the thickness of the coating and hence indicates the thickness of the coating. The invention has particular application where a thin coating of variable thickness is formed on a thick base or on a base of constant thickness. By a thick base is meant one which is so thick that a small change in thickness produces no noticeable change in the beam intensity ratio. By a thin coating is meant one which is so thin that a small change in thickness produces a noticeable change in the beam intensity ratio. In all the examples that follow the coatings are thin and the bases are thick. By employing a diverging incident beam 44 and by employing diverging return beams 51, 51 as described above, the measurements so obtained are rendered substantially free of variations in diffraction effects that might otherwise arise because of changes of the crystalline structure of the coating material or the base material or because of variations in inclination of the coated strip 10 as it passes through the testing zone 14. Several examples of the application of this invention are described below.

*Gauging of tin coatings on iron*

Figure 3:
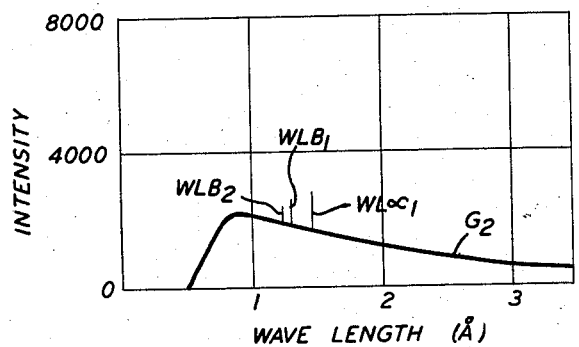
Fig. 3 is a graph representing the spectrum of X-rays generated at a tungsten target.

*Example I.*—This example relates to the determination of the thickness of a tin coating on an iron base. The accelerating voltage produced by the power supply 38 was 30 kv. The anode, or target, was composed of tungsten. A typical spectrum of the X-ray radiation emerging from the source 30 in such a case and irradiating the tin-plated iron sheet 10 is illustrated in Fig. 3. Here it will be noted that the heterochromatic spectrum consists of a continuous broad band of black-body-like radiation upon which several lines characteristic of tungsten appear. In this case, one of the monochromators 50 was set to produce a monochromatic beam having a wavelength of 1.48 A., and the other was set to produce a monochromatic beam having a wavelength of 2.2 A. Neither of these monochromatic beams contains any substantial amount of fluorescent X-ray radiation emitted by the coated strip.

In this particular instance, most of the energy of wavelength 2.2 A. represents scattered radiation which is produced by the scattering of part of the incident beam 44 by the tin atoms in the outer part of the tin coating. However, some of the energy of 2.2 A. penetrates the iron base and is scattered outwardly through the tin coating. Also in this case, the beam of radiation having a wavelength of 1.48 A. represents parts of the incident beam 44 that is scattered upwardly by the tin atoms in the coating and by the iron atoms in the base. These phenomena are illustrated schematically in Fig. 4a.

As shown in Fig. 4a, part of the incident radiation having a wavelength of 2.2 A. is returned upwardly by the tin coating 10C and part from the base 10B, and parts of the incident radiation having a wavelength of 1.48 A. are scattered upwardly from atoms within the tin coating 10C and also by atoms in the iron base 10B. The X-ray scattering and absorption coefficients of tin and iron vary differently with wavelength. Thus the intensity of the 2.2 A. beam varies as one function of the thickness of the tin coating, and the intensity of the 1.48 A. beam varies as another function of that thickness. For this reason, the ratio of the intensities of the two beams depends on the thickness of the tin coating. In this instance, the 1.48 A. radiation is scattered tungsten radiation. By utilizing this wavelength, advantage is taken of the fact that the tungsten line in the source is more intense than any part of the black-body radiation at the low accelerating voltage of 30 kv.

In this example, the indication of the ratiometer 60 is given by the equation $$R = \frac{\text{Intensity of 1.48 A. radiation}}{\text{Intensity of 2.2 A. radiation}}$$

A graph G1 showing how this ratio varies with the thickness of the coating is illustrated in Fig. 5. In this figure, ordinates represent thickness of the tin in lbs./bb., and abscissae represent ratios of beam intensities. As is well known, 1 lb./bb. is equivalent to $121 \times 10^{-6}$ in. of tin.

In order to determine the thickness of a tin coating on an iron sheet or strip, the ratio of beam intensities is determined by means of the ratiometer 60, and the thickness of the tin coating is determined directly from the graph G1 of Fig. 5. The sensitivity or discrimination of a specific process depends upon the readings obtained for coatings of specific thickness. Thus the sensitivity can be expressed by the ratio $$S = \frac{R_H}{R_I}$$

where $R_H$ = ratio for a thick coating having a specific thickness, and $R_I$ = ratio for a thin coating having a specific thickness.

When the thickness of the thick and thin coatings is 1.27 lb./bb. and 0.07 lb./bb. respectively, the sensitivity $S_1$ of this technique is $$S_1 = 3.6$$

*Example II.*—In this case the thickness of a tin coating on an iron base is also to be determined. In this case, the accelerating voltage is set at 50 kv., and the two monochromators are set to produce beams having the wavelengths 0.49 A. and 2.2 A. respectively. The radiation in the beam having the wavelength 2.2 A. represents incident radiation that is scattered, as explained above. The beam having a wavelength of 0.49 A. is composed substantially entirely of fluorescent emission radiation excited in the tin atoms by the incident radiation. More particularly, the fluorescent X-ray radiation of wavelength 0.49 A. is excited by short wavelength components of the incident radiation. Such components are produced when the accelerating voltage is more than about 30 kv., and are not produced when the accelerating voltage is only 30 kv. or less, as in Example I.

In the present case, the process involved is represented schematically in Fig. 4b. It is to be noted that the 2.2 A. radiation represents incident radiation that is scattered in the tin coating 10C and in the iron base 10B, while the 0.49 A. radiation represents fluorescent radiation and also some scattered radiation having a wavelength of 0.49 A. and emerging from the atoms in the tin coating 10C. Usually very little of this radiation emerges from the iron base 10B.

In this case, a graph G2 as represented in Fig. 5 is also obtained by making measurements on reference specimens of known thickness. It has been found that the discrimination ratio $S_2$ of this system, when employing the wavelengths of 0.49 A. and 2.2 A. is $$S_2 = 8.4$$

In this case, too, when a ratio measurement is obtained for a specimen, the thickness of the tin coating can be determined from the graph G2. Inasmuch as the 0.49 A. beam is composed substantially entirely of fluorescent radiation emitted by the tin atoms, the ratio measurement obtained gives a substantially correct measure of the tin coating thickness irrespective of variations in composition or structure of the iron base. This method is especially advantageous to use when the composition or structure of the iron base is subject to variation from one roll of iron strip to another.

*Example III.*—This example is similar to Example II in that a 50 kv. X-ray source is employed, and use is made of fluorescent emission phenomena. However, in this case the monochromators are set to permit detection of two separate monochromatic beams having wavelengths of 0.49 A. and 1.94 A. respectively. As before, radiation having a wavelength of 0.49 A. represents fluorescent radiation excited in the tin by the incident radiation from the source 30. But the radiation having a wavelength of 1.94 A. is composed substantially entirely of fluorescent radiation excited in the iron by the incident X-ray beam 44, though some 1.94 A. radiation scattered by both the tin and the iron is included. The phenomenon involved in this case is represented schematically in Fig. 4c.

Graph G3 of Fig. 5 is a calibration curve obtained for this technique. The sensitivity $S_3$ in this case was $$S_3 = 15$$

This discrimination ratio is superior to that of either Example I or Example II. Optimum sensitivities are obtained in cases like this where the intensity of one beam increases and the intensity of the other beam decreases as the thickness increases.

*Example IV.*—In this case, the accelerating voltage was set at 30 kv., and the monochromators were set to produce monochromatic beams having wavelengths of 1.48 A. and 1.94 A. The discrimination ratio was 6.2.

*Galvanized iron*

The invention is also applicable to other coating and other base materials, for example, in gauging the thickness of a zinc coating on galvanized iron. More particularly, a discrimination ratio of 48 has been found when employing an accelerating voltage of 30 kv. when one of the monochromators is set at 1.48 A., the wavelength of the tungsten line, and the other monochromator is set at a wavelength of 1.94 A., the wavelength of the fluorescent $K\alpha$ emission line of iron. Likewise a discrimination ratio of 35 has been found when employing a 50 kv. source and when setting the monochromators at 2.2 A. and 1.94 A. respectively. And likewise, a discrimination ratio of 42 was obtained when the accelerating voltage was set at 50 kv. and the monochromators were set at 1.44 A. and 1.94 A. In the case of galvanized iron, too, calibration curves are formed as explained above, and the thickness of a zinc coating on a specimen is determined from the measured ratio and the calibration curve. The thick and thin zinc coatings employed in measuring the discrimination ratios given had a thickness of 1.59 oz./ft.$^2$ and 0.26 oz./ft.$^2$ where 1 oz./ft.$^2$ = 0.0017″.

*General remarks*

This invention may also be applied by selecting wavelengths of other values. Furthermore, it is not necessary for the detected beams to be monochromatic, it generally being necessary, however, that the two beams lie in different wavelength bands. Such difference can be obtained by the use of suitable filters or, in effect, by the use of detectors having different spectral characteristics. It is essential that the ratio of the intensities of the two detected beams vary with the thickness of the coating, but, since it is extremely unusual for the intensities of two beams of different wavelengths to vary with the thickness of the coating in a constant proportion to each other, almost any two wavelengths may be employed.

Generally speaking, the intensity of radiation that is returned in one of the monochromatic beams to one of the detectors can be represented by an equation of the following type:

$$S = S_b e^{-\mu\rho x} + S_c(1 - e^{-2\mu\rho x})$$

where $S_b$ = the scattering coefficient of the base material;
$S_c$ = the scattering coefficient of the coating material;
$\mu$ = mass absorption coefficient of the coating material;
$\rho$ = density of the coating material;
$x$ = coating thickness.

The values of $S_b$, $S_c$, and $\mu$ are those which correspond to the wavelength of the monochromatic beam being detected. The ratio of intensities of two monochromatic beams of different wavelengths will vary with the thickness of the coating, if the mass absorption coefficient $\mu$ is different at the two wavelengths. Advantage is taken of this type of phenomenon in Example I.

The intensity of fluorescent radiation excited in the coating increases with the thickness of the coating. Where such a fluorescent beam and a scattered beam are being detected, the ratio of intensities of the two beams would depend upon the thickness so long as the intensities of these two beams are different functions of the coating thickness. Advantage is taken of this kind of phenomenon in Example II above.

Similarly, the intensity of fluorescent radiation excited in the base decreases with thickness of the coating as in Example III above. Advantage is taken of the fact that the intensity of fluorescent radiation excited in the coating and the base varies in opposite directions.

In the examples cited above, comparative sensitivities were measured in a specific way. It will be understood, however, that other ways of comparing sensitivity may be employed. Usually, though, as in the cases illustrated in the graph of Fig. 5, the relative sensitivity of the systems can best be ascertained by adjusting the values of the beam intensity ratios to a common value or meter setting on a coating of a particular thickness. In the cases illustrated in Fig. 5, the gains or amplifications in the inputs of the ratiometer were adjusted to provide a meter indication of 0.1 for an uncoated iron strip. Such adjustment can be readily made by means of potentiometers or like variable elements (not shown) arranged between the respective detectors and the inputs of the ratiometer.

If desired, the ratiometer may be of the recording type instead of being merely of the indicating or measuring type. When a recording type potentiometer is employed, the recording paper is driven at a rate proportional to the rate of movement of the coated strip in any conventional manner, so that readings on the record may be readily coordinated with various parts of the coated strip.

By utilizing the ratio of intensities of two beams in accordance with this invention, the percentage change in the measurement obtained is small compared with changes in the distance of the coated strip from the X-ray source and detectors. As a result, this method provides a more accurate measure of coating thickness than heretofore available under circumstances where such distance was subject to change. Furthermore, by employing this method, the necessity for close regulation of voltage and currents supplied by the power supplies is avoided. For this reason, the invention is applicable to the accurate determination of coating thickness even if power supplies that are not closely regulated are employed. Thus the invention has utility whether or not the position of the coated strip is accurately controlled as it passes through the testing zone.

Though the invention has been described only with reference to specific materials tested under specific conditions and with reference to specific apparatus, it will be understood that it is applicable under many other conditions and with other materials and with other apparatus, all within the scope of the appended claims.

The invention claimed is:

1. In determining the thickness of a coating of one material on a base of another material in a test sample, the method that comprises the steps of: directing a beam of X-rays toward said test sample onto the coated side thereof, thereby causing X-rays to be returned from said coated side; separately detecting X-rays in two different wavelength ranges that are returned from said coated side by virtue of incidence of such beam of X-rays onto said test sample, the intensities of said X-rays in said two wavelength ranges being different functions of the thickness of said coating; measuring the ratio of intensities of the detected X-rays in the respective wavelength ranges; making similar ratio measurements with a reference specimen having a coating of known thickness of said one material on said base material; and comparing the ratio measurement obtained for said test sample with the ratio measurement obtained for said reference specimen in order to determine the thickness of the coating of said one material in the test sample.

2. In determining the thickness of a coating of one material on a base of another material in a test sample, the method that comprises the steps of: directing a diverging beam of X-rays toward said test sample onto the coated side thereof, thereby causing divergent beams of X-rays to be returned from said coated side; separately detecting diverging beams of X-rays in two different wavelength ranges that are returned from said coated side by virtue of incidence of such directed beam of X-rays onto said test sample, the intensities of said detected X-ray beams being different functions of the thickness of said coating; measuring the ratio of intensities of the detected X-ray beams in the respective wavelength ranges; making similar ratio measurements with a reference specimen having a coating of known thickness of said one material on said base material; and comparing the ratio measurement obtained for said test sample with the ratio measurement obtained for said reference specimen in order to determine the thickness of the coating of said one material in the test sample.

3. In determining the thickness of a coating of one material on a base of another material in a test sample, the material in said coating having an absorption edge at a lower wavelength than the material in said base, the method that comprises the steps of: directing a heterochromatic beam of X-rays toward said test sample onto the coated side thereof, thereby causing beams of X-rays to be returned from said coated side; separately detecting beams of X-rays in two different wavelength ranges that are scattered from material in said test sample and are returned from said coated side by virtue of incidence of such directed beam of X-rays onto said test sample, the intensities of said detected X-ray beams being different functions of the thickness of said coating; measuring the ratio of intensities of the detected X-ray beams in the respective wavelength ranges; making similar ratio measurements with a reference specimen comprising a coating of known thickness of said one material in said reference specimen in order to determine the thickness of the coating of said one material in the test sample.

4. In determining the thickness of a coating of one material on a base of another material in a test sample, the method that comprises the steps of: directing a beam of X-rays toward said test sample onto the coated side thereof, thereby causing X-rays to be returned from said coated side; separately detecting X-rays in two different wavelength ranges that are scattered by material in said test sample and returned from said coated side by virtue of incidence of such beam of X-rays onto said test sample, one and only one of said wavelength ranges lying between the absorption edges of said two materials; measuring the ratio of intensities of the detected X-rays in the respective wavelength ranges; making similar ratio measurements with a reference specimen comprising a coating of known thickness of said one material on said base material; and comparing the ratio measurement obtained for said test sample with the ratio measurement obtained for said reference specimen in order to determine the thickness of the coating of said one material in the test sample.

5. In determining the thickness of a coating of one material on a base of another material in a test sample, the method that comprises the steps of: directing a beam of X-rays toward said test sample onto the coated side thereof, thereby causing X-rays to be returned from said coated side, a portion of such X-rays exciting fluorescent emission from said coating; detecting X-rays in the wavelength range of X-rays that are due to excitation of fluorescence of said coating; detecting X-rays in another wavelength range that are returned from said coated side by scattering of such directed X-rays from said test sample; measuring the ratio of intensities of the detected X-rays in the respective wavelength ranges; making similar ratio measurements with a reference specimen having a coating of known thickness of said one material on said base material; and comparing the ratio measurement obtained for said test sample with the ratio measurement obtained for said reference specimen in order to determine the thickness of the coating of said one material in the test sample.

6. In determining the thickness of a coating of one material on a base of another material in a test sample, the method that comprises the steps of: directing a beam of X-rays toward said test sample onto the coated side thereof, thereby causing X-rays of two different wavelengths to be excited by fluorescence of said coating material and said base and to be returned from said coated side; separately detecting X-rays in different ranges including said two different wavelengths that are returned from said test sample; measuring the ratio of intensities of the detected X-rays in the respective wavelength ranges; making similar ratio measurements with a reference specimen having a coating of known thickness of said one material on said base material; and comparing the ratio measurement obtained for said test sample with the ratio measurement obtained for said reference specimen in order to determine the thickness of the coating of said one material in the test sample.

7. In determining the change in thickness of a coating of one material on a base of another material in a strip, the method that comprises the steps of: directing a beam of X-rays toward a test zone; advancing said strip through said test zone with a coated side of said strip exposed directly to said beam; separately detecting X-rays in two different wavelength ranges that are returned from the same side of said strip by virtue of incidence of such beam of X-rays on said strip as said strip is advanced through said test zone, the intensities of said X-rays in said two wavelength ranges being different functions of the thickness of said coating; measuring the ratio of intensities of the detected X-rays in the respective wavelength ranges as said strip is advanced through said test zone; and detecting a change in said ratio as said strip is advanced through said test zone to indicate a change in thickness of said coating.

8. In determining the change in thickness of a coating of one material on the base of another material in a strip, the method that comprises the steps of: directing a beam of X-rays toward a test zone; advancing said strip through said test zone with a coated side of said strip exposed directly to said beam; detecting X-rays in one wavelength range that are returned from said coated side by scattering of some of such directed X-rays by said coated strip as said strip is advanced through said test zone; detecting X-rays in a different wavelength range that includes fluorescent rays excited in said coating by said directed beam of X-rays as said strip is advanced through said test zone; measuring the ratio of intensities of the detected X-rays in the respective wavelength ranges as said strip is advanced through said test zone; and detecting a change in said ratio as said strip is advanced through said test zone to indicate a change in thickness of said coating.

9. In determining the change in thickness of a coating of one material on a base of another material in a strip, the method that comprises the steps of: directing a beam of X-rays toward a test zone; advancing said strip through said test zone with the coated side of said strip exposed directly to said beam whereby fluorescent X-rays of different wavelengths are excited in said coating and in said base by said directed beam of X-rays; separately detecting X-rays of said two different wavelengths that are returned from the same side of said strip as said strip is advanced through said test zone; and detecting a change in the ratio of the intensities of said detected X-rays as said strip is advanced through said test zone to indicate a change in thickness of said coating.

10. In a process of forming a coating of one material on a base of another material in a strip, the method that comprises the steps of: directing a beam of X-rays toward a test zone; continuously applying a coating of said one material to successive parts of said strip; continuously advancing said successive parts of said strip after coating through said test zone with the coated side of said strip exposed directly to said beam; separately detecting X-rays in two different wavelength ranges that are returned to the same side of said coated strip by virtue of incidence of such beam of X-rays on said coated strip as said strip is advanced through said test zone, the intensities of said X-rays in said two wavelength ranges being different functions of the thickness of said coating; measuring the ratio of intensities of the detected X-rays in the respective wavelength ranges as said coated strip is advanced through said test zone; and regulating the thickness of said coating by controlling the application of said coating material to said strip of base material in accordance with the measured ratio.

11. In a system for measuring the thickness of a coating formed on a strip of base material, the combination of: means for continuously advancing a coated strip through a test zone; means including a source of X-rays for irradiating a portion of said coated strip in said test zone as said coated strip is being advanced therethrough, said source being located to irradiate said strip from the coated side thereof and for returning X-rays from said coated strip toward the side thereof from which said strip is irradiated; means for detecting returned X-rays in two different wavelength ranges, the intensities of said X-rays in said two wavelength ranges being different functions of the thickness of said coating; and means for measuring the ratio of the intensities of the detected X-rays in said two ranges.

12. In a system for measuring the thickness of a coating formed on a strip of base material, the combination of: means for continuously advancing a coated strip through a test zone; means including a source of X-rays for irradiating a portion of said coated strip in said test zone as said coated strip is being advanced therethrough, said source being located to irradiate said strip portion from the coated side thereof; a pair of X-ray detectors; means for transmitting to the respective detectors X-rays in two different wavelength ranges emerging from said strip on the coated side thereof, the intensities of said X-rays in said two wavelength ranges being different functions of the thickness of said coating; and means connected to said detectors for measuring the ratio of the intensities of the detected X-rays in said two wavelength ranges emerging from different parts of said coated strip as they pass through said test zone.

13. In a system for measuring the thickness of a coating formed on a strip of base material, the combination of: means for continuously advancing a coated strip through a test zone; means including a source of X-rays for irradiating a portion of said coated strip in said test zone with a diverging beam of X-rays as said coated strip is being advanced therethrough, said source being located to irradiate said strip portion from the coated side thereof; a pair of X-ray detectors; means for transmitting to the respective detectors two non-collimated beams of X-rays in two different wavelength ranges each of which includes rays that emerge along non-parallel paths from said strip on the coated side thereof; and means connected to said detectors for measuring the ratio of the intensities of the detected beams.

14. In a system for measuring the thickness of a coating being formed on a strip of base material, the combination of: a coating stage; means for continuously advancing an uncoated strip of said base material through said coating stage to apply a coating thereto; means for continuously advancing the coated strip through a test zone; means including a source of X-rays for irradiating a portion of said coated strip in said test zone as said coated strip is being advanced therethrough, said source being located to irradiate said strip portion from the coated side thereof and for returning X-rays from said coated strip toward the side thereof from which said strip is irradiated; means for detecting returned X-rays in two different wavelength ranges; and means responsive to changes in the ratio of the intensities of the detected X-rays in said two wavelength ranges for regulating the application of the coating to said strip whereby the thickness of the applied coating is controlled.

15. In a device for measuring the thickness of a coating of one material on a base of another material in an object under investigation: means including a source of X-rays for directing X-rays through said coating toward said base material whereby such X-rays penetrate said coating and X-rays are returned from said object through the external surface of said coating; means for detecting such returned X-rays in two different wavelength ranges, the intensities of said X-rays in said two wavelength ranges being different functions of the thickness of said coating; and means for measuring the ratio of the intensities of the detected X-rays in said two ranges.

16. In a device for measuring the thickness of a coating of one material on a base of another material in an object under investigation: means including a source of X-rays for directing X-rays through said coating toward said base material whereby such X-rays penetrate said coating and X-rays are returned from said object through the external surface of said coating; a pair of X-ray detectors; means for transmitting to the respective detectors X-rays in two different wavelength ranges that are returned from said coating, the intensities of said X-rays in said two wavelength ranges being different functions of the thickness of said coating; and means connected to detectors for measuring the ratio of the intensities of the detected X-rays in said two wavelength ranges.

17. In a device for measuring the thickness of a coating of one material on a base of another material in an object under investigation: means including a source of X-rays for directing X-rays through said coating toward said base material whereby such X-rays penetrate said coating and X-rays are returned from said object through the external surface of said coating; a pair of X-ray detectors; means for transmitting to the respective detectors two non-collimated beams of X-rays in two different wavelength ranges, each of which includes rays that emerge from said coating along nonparallel paths; and means connected to said detectors for measuring the ratio of the intensities of the detected beams.

References Cited in the file of this patent

UNITED STATES PATENTS

| 2,653,247 | Lundahl | Sept. 22, 1953 |
| 2,711,480 | Friedman | June 21, 1955 |

OTHER REFERENCES

An X-ray Method for Determining Tin Coating Thickness on Steel, by Beeghly, from Journal of the Electrochemical Society, vol. 97, #4, April 1950, pages 152–157.